US006268806B1

(12) United States Patent
Frager et al.

(10) Patent No.: US 6,268,806 B1
(45) Date of Patent: Jul. 31, 2001

(54) MULTIMEDIA COMPUTER KEYBOARD

(75) Inventors: David L. Frager; Richard J. Lawson; Joseph W. Bell, all of Austin, TX (US)

(73) Assignee: Dell USA, L.P., Round Rock, TX (US)

(*) Notice: Subject to any disclaimer, the term of this patent is extended or adjusted under 35 U.S.C. 154(b) by 1167 days.

(21) Appl. No.: 08/588,836

(22) Filed: Jan. 19, 1996

Related U.S. Application Data

(63) Continuation of application No. 08/125,063, filed on Sep. 21, 1993, now abandoned.

(51) Int. Cl.[7] .................................................. H03M 11/00
(52) U.S. Cl. ............................ 341/22; 341/27; 84/644; 381/205; 345/168; 708/142; 708/174
(58) Field of Search ...................... 341/27, 20, 22; 381/24, 205; 345/168, 169; 84/644, 670, 719, 744; 379/110; 708/174, 142

(56) References Cited

U.S. PATENT DOCUMENTS

| | | | |
|---|---|---|---|
| 4,653,375 | * | 3/1987 | Honda et al. ........................ 84/644 |
| 4,908,612 | * | 3/1990 | Bromley et al. ................... 340/706 |
| 4,970,673 | * | 11/1990 | Ueda ............................. 364/710.12 |
| 5,139,439 | * | 8/1992 | Shie ................................ 364/708.1 |
| 5,410,497 | * | 4/1995 | Viletto ............................. 364/708.1 |

FOREIGN PATENT DOCUMENTS 1-119821  *  5/1989  (JP).

OTHER PUBLICATIONS

Knight–Ridder Newspapers "NMB Keyboard Could Be Speaker–Problem Answer", *Austin American–Statesman*, (Feb. 3, 1996), Business Section D5.
"Keyboard Assembly with Docking Speakers", IBM Technical Disclosure Bulletin, vol. 36, No. 04, Apr. 1993.*
"The Perfect Notebook", PC Magazine, p 116, Jul. 1994.*

* cited by examiner

*Primary Examiner*—Daniel J. Wu
(74) *Attorney, Agent, or Firm*—Haynes and Boone, L.L.P.

(57) ABSTRACT

A multimedia computer keyboard is provided having one or more high fidelity, diaphragm-type speakers mounted within the keyboard. Mono or stereophonic wiring to each speaker is achieved using existing keyboard cable extending from the keyboard to a keyboard connector arranged upon a host computer. A terminal at the end of the keyboard cable can plug directly into the keyboard connector, such that the terminal can receive an audio output signal generated from a sound card placed within the computer. Accordingly, audio output can be sent to the computer keyboard as an integrated system in order to achieve multimedia function.

6 Claims, 2 Drawing Sheets

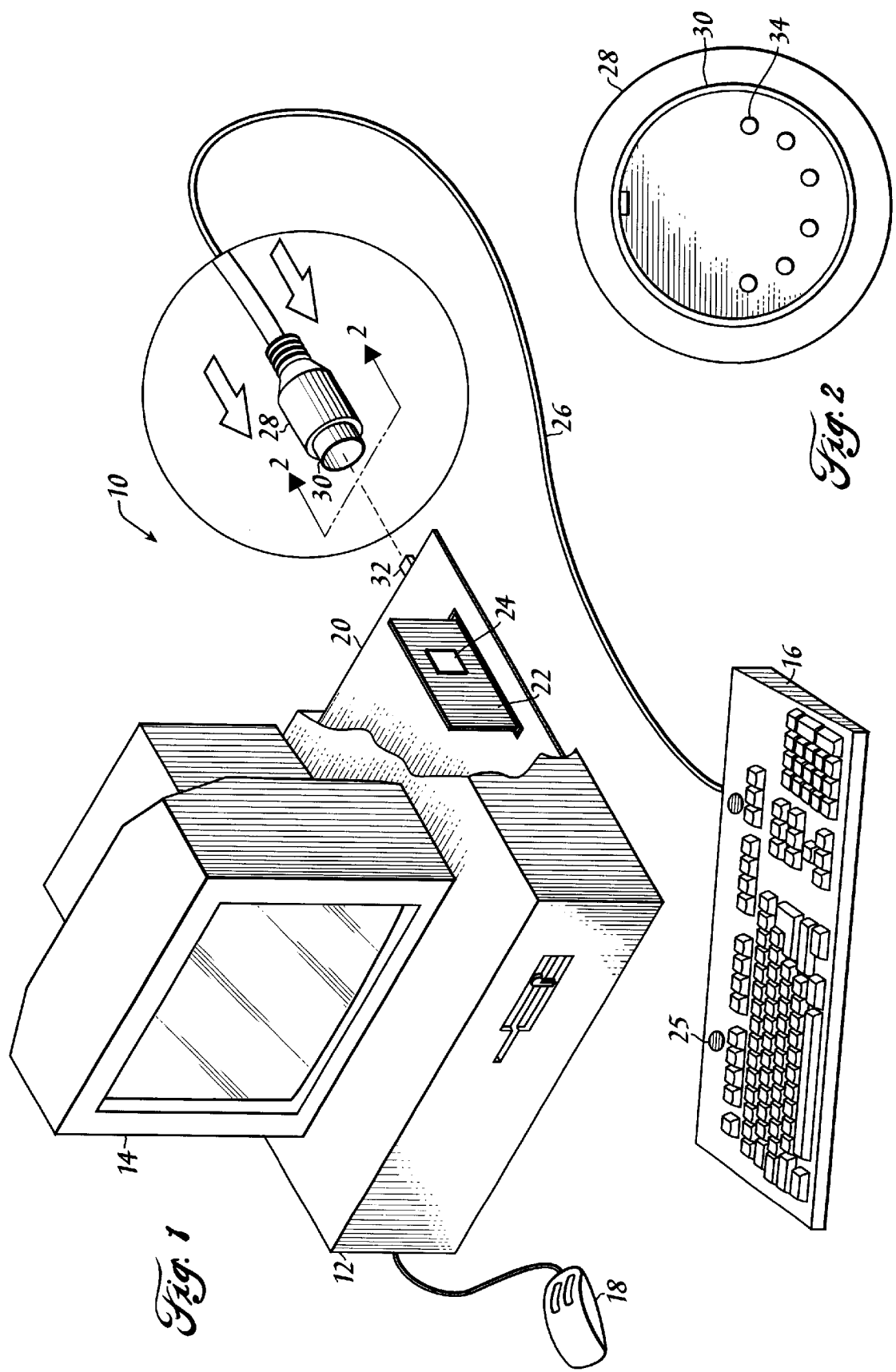

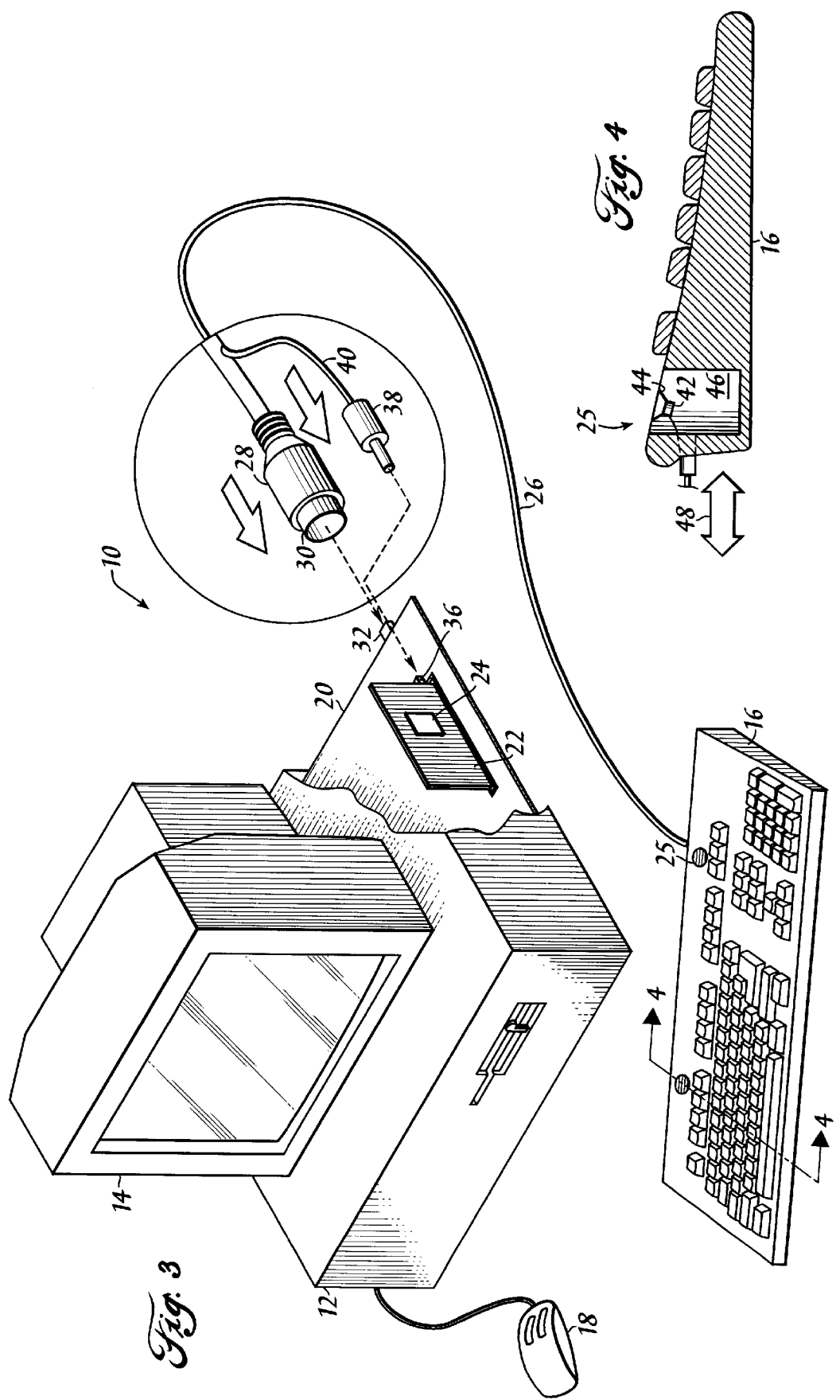

MULTIMEDIA COMPUTER KEYBOARD

This is a continuation of application Ser. No. 08/125,063 filed Sep. 21, 1993, now abandoned.

BACKGROUND OF THE INVENTION

1. Field of the Invention

This invention relates to a computer keyboard and more particularly to a multimedia computer keyboard embodying a speaker capable of producing computer-generated sound.

2. Background of the Relevant Art

Multimedia systems which produce computer-generated sound are well known. Early systems often employ transducers which produce a buzz or beep when activated. The buzzers or alarms which are mounted within the computer housing or mainframe are generally piezoelectric-type transducers. A sound card, also mounted within the mainframe, generates an electrical signal sent over a conductor coupled to the piezoelectric transducer. Once the transducer receives electrical stimulus, it responds by vibrating and thereby producing an acoustic pulse (i.e., a sound wave). The conversion of electrical energy to mechanical energy within certain crystalline or ceramic substances (termed "piezoelectric effect") is a well known phenomena which produces an efficient, solid state transducer.

Piezoelectric transducers, however, do not have the ability to produce high quality sound over a broad frequency spectrum. Generally speaking, piezoelectric transducers are used only to emit one or more beeps of slightly variable pitch. They do not and cannot produce high fidelity voice and music playback necessary in more advanced multimedia applications. Recent developments in computer-generated sound involve the use of electro-acoustic transducers of higher quality than the piezoelectric type.

Audio output from the sound card is generally of high quality (broad frequency response range, low distortion and high output). In order to take full advantage of high fidelity audio output, computer manufactures have begun to realize the importance of using higher quality sound reproduction using transducers such as diaphragm-type speakers. The diaphragm-type speakers are often mounted within an enclosure and placed adjacent the computer housing. Diaphragm-type speakers generally convert the electrical output from the sound card to field energy (magnetic or electric), wherein the field drives the diaphragm. The moving diaphragm produces sound waves detectable by the listener or operator. The diaphragm can consist of numerous shapes and sizes. Popular shapes include a cone, dome or metallic ribbon. Diaphragm-type speakers must be mounted within an enclosure so as to support the speaker drive units and provide necessary acoustic properties (e.g., radiation pattern and driver acoustic loading). The enclosure can be open backed or conceal a horn or other system folded into a compact structure within the enclosure. During use, the vibrating diaphragm will simultaneously excite the driver chassis or enclosure causing it to vibrate in symphony. The enclosure therefore must be carefully designed to prevent it from moving, and hence reducing the diaphragm output. If the energy transferred to the enclosure is not properly dissipated, the resonant modes of the enclosure may be audible thereby causing a reduction in the overall sound quality produced by the speaker.

Many conventional multimedia systems which use a diaphragm-type speaker are restricted to using a separate enclosure for the speaker and arranging the enclosed speaker adjacent the computer housing. Unfortunately, routing of conductor wires from the sound card to the speakers is often a nuisance. Separate wires must be purchased and routed from the speaker to the sound card audio output. Furthermore, an audio plug is needed which can couple the wires to the audio card connector. Connection of separate, enclosed speakers to the sound card is not only cumbersome, but it is also time consuming. Disconnect and reconnect is an unfortunate necessity each time the operator chooses to move his or her computer. The problems are particularly acute when using a portable computer. Separate enclosed speakers cannot as a practical matter be used with portable computers unless the operator is willing to carry the speakers, as separate items, with the computer—a burden which most consumers may be unwilling to bear.

In an effort to overcome the problems of using separate enclosed speakers, many multimedia systems often employ diaphragm-type speakers mounted directly on the computer housing or electronic display (monitor). By using the housing associated with the computer, the system can take advantage of higher quality diaphragm-type sound reproduction without the problems of having to connect separate wires between the speakers (mounted within the computer) and the computer. Thus, the speakers can be fully integrated into the computer or display for ease of portability.

Although integrated computer/speaker multimedia systems present many advances over remote speakers and associated cabling, speakers mounted within the computer housing or display suffer many drawbacks. In particular, the operator must face the computer or display in order to obtain the full benefits of audio reproduction. In most instances, the operator faces the keyboard and only periodically turns his or her attention to the display. The computer can often be hidden away from sight, as is the case in remotely placed, upright models. Audio playback from a remotely located speaker placed on the computer cannot utilize high fidelity reproduction to its maximum advantage. While speakers mounted within the display might be more advantageous than those mounted in the computer housing, speakers mounted in the display often require wires routed from the audio card (within the computer) to the separate display. Thus, display-mounted speakers suffer the same drawback as separate, remote speaker enclosures described above.

In order to overcome the problems with current multimedia systems, it would be advantageous to mount the speakers within the computer system for ease of portability. It would also be beneficial to ensure the speakers reside directly in front of the operator during times in which the operator is interfacing the system. Still further, it would be desirable to route the audio signal from the sound card to the diaphragm-type speaker through existing cables, conductors and connectors.

SUMMARY OF THE INVENTION

The problems outlined above are in large part solved by the computer keyboard of the present invention. That is, the computer keyboard hereof comprises one or more speakers mounted onto or within the keyboard. Acoustically shaped cavities can be formed within the keyboard housing to provide a suitable enclosure for receiving high quality diaphragm-type speakers. Moreover, connection between the speaker or speakers and the sound card can be achieved using the existing multi-conductor keyboard cable coupled between the keyboard and the computer.

An operator spends a considerable amount of time inputting information via the keyboard. By ergonomically placing the speakers within the keyboard, the operator is allowed the advantage of facing directly into the speaker output for optimal enjoyment. The operator need not turn his or her head toward the speakers mounted within the display, the computer, or remote enclosures, as in conventional designs. Instead, the operator can input data while enjoying the full benefits of the high quality audio output attainable from the keyboard-mounted speaker. Electrical signals are sent from the sound card output to the keyboard using existing conductors within the multi-conductor keyboard connector. No additional wiring or connectors are needed to present the audio signals to the keyboard. All that is required is that the speakers be mounted within existing space upon the keyboard, and that an acoustic-quality cavity be formed within the keyboard to enclose the speakers.

Broadly speaking, the present invention contemplates a computer keyboard comprising at least one speaker mounted to the computer keyboard. A keyboard cable is coupled to the keyboard and includes one conductor within the cable electrically connected to the speaker. The conductor is capable of receiving current of varying frequency corresponding to sound waves reproduced by the speaker during its use.

As defined herein, "computer keyboard" includes any electromechanical device necessary for the entry of data into a digital system. Data can be entered as numerical codes, numbers, plain text, or a combination of the above. The keyboard can be designed having electromechanical key switches mounted directly to a printed circuit board. The printed circuit board comprises a microcontroller which performs key decoding and organizes the data for serial transmission over a keyboard cable connected to the host computer. Keyboard also includes the term "key pad" which uses short-travel switch contacts covered with individual caps or a flexible membrane. When pressed, the short-travel switch shorts metal contacts on a supporting substrate arranged on or near the associated circuit board. As further defined herein "speaker" includes a high fidelity diaphragm resonator-type speaker (diaphragm-type speaker) which converts electrical current of varying frequency into sound waves with substantially the same frequency characteristics within the range of hearing (approximately 16 Hz to 20 KHz). The speaker comprises a diaphragm partially enclosed within the keyboard, wherein the diaphragm is responsive to field energy generated by current sent over a conductor within the keyboard cable. The speaker is capable of a frequency response range at least as wide as 100 Hz to 12 KHz, and in many instances wider than 100 Hz to 12 KHz.

The keyboard cable may comprise six conductors, and two speakers may be mounted in the keyboard, wherein one of the six conductors is coupled to one speaker (a left channel speaker) and another of the six conductors is coupled to the other speaker (right channel speaker). The left and right channel speakers are thereby capable of producing stereo sound wave output. Coupled at one end of the keyboard cable is a five pin or six pin terminal connector which can be coupled to a primary electrical coupling mounted to the computer.

The present invention further contemplates a multimedia computer-based system comprising a computer keyboard having at least one speaker mounted to the keyboard. A multi-conductor keyboard cable is also provided and coupled to the keyboard, wherein one conductor of the multi-conductor cable is coupled to the speaker. A computer is also provided having a primary electrical coupling mounted thereto. The primary electrical coupling is adapted to electrically receive one end of the multi-conductor keyboard cable. A sound card is mounted within the computer for producing an audio output signal. The audio output signal is capable of being transmitted over the conductor, during use.

The multimedia computer-based system further comprises an audio output pin arranged upon the sound card for producing an audio output signal. A first wire is routed across the sound card from the audio output pin to a termination point. A second wire is routed across another card mounted within the computer from the termination point to the primary electrical coupling. The primary electrical coupling is adapted to receive all conductors within the multi-conductor cable. Accordingly, the primary electrical coupling can provide full electrical communication between the computer and the keyboard, including keystroke data as well as audio signals. Alternatively, the primary electrical coupling can be used only to provide keystroke data transferal but not the audio signals. Instead, the first wire can be routed from the audio output pin to a secondary electrical coupling. The secondary electrical coupling is adapted to receive the conductor or conductors which transmit the electrical audio signals to the keyboard. By using a secondary electrical coupling on the sound card, and a primary electrical coupling mounted to the computer, no special wiring is needed on the computer motherboard, and the computer need not be retrofitted in any way. It is advantageous in some instances, however, to use only a single electrical coupling (primary electrical coupling) to achieve full transferal of all signals to and from the computer keyboard, including audio signals. However, when using only a single primary electrical coupling, various cards such as the motherboard may need to be redesigned to embody the necessary routing.

BRIEF DESCRIPTION OF THE DRAWINGS

Other objects and advantages of the invention will become apparent upon reading the following detailed description and upon reference to accompanying drawings in which:

FIG. 1 is a perspective, partial breakaway and detailed view of a multimedia computer-based system having a speaker mounted to a keyboard according to the present invention;

FIG. 2 is a view along plane 2—2 of FIG. 1;

FIG. 3 is a perspective, partial breakaway and detailed view of a multimedia computer-based system according to an alternative embodiment of the present invention; and FIG. 4 is a view along plane 4—4 of FIG. 3.

While the invention is susceptible to various modifications and alternative forms, specific embodiments thereof are shown by way of example in the drawings and will herein be described in detail. It should be understood, however, that the drawings and description thereto are not intended to limit the invention to the particular forms disclosed, but on the contrary, the intention is to cover all modifications, equivalents and alternatives falling with the spirit and scope of the present invention as defined by the appended claims.

DETAILED DESCRIPTION OF THE INVENTION

Turning now to FIG. 1, a multimedia computer-based system 10 is shown. System 10 includes desktop computer (host) 12, display 14, computer keyboard 16 and, in many instances, mouse 18. Computer 12 may include any device of a desktop-variety which aids in computation and is capable of producing digital signals representing the computation. Computer 12 includes various computing devices, internal memory, stored instruction sets, etc., well known to those skilled in the art. A suitable computer can be a personal computer (PC) of IBM®-compatible variety. Computer 12 includes a main board or card 20 (often referred to as a motherboard) and a plurality of cards mounted upon card 20. One such card, sound card 22, can be mounted onto card 20 and is used to produce an electrical signal at an audio output pin 24 arranged upon card 22.

There are many types of sound cards available to the consuming public. Sound card 22 converts software-driven digital signals to sound-quality analog signals at the audio output pin 24 of the sound card. Although various types of sound cards are available which produce high quality audio output, a suitable card having said output includes SOUND BLASTER™ card which can be obtained from Creative Labs, Inc., Milpitas, Calif.

Computer keyboard 16 is retrofitted to include at least one speaker 25 mounted thereto. Speaker 25 is capable of high quality acoustic output generated from a vibrating diaphragm placed beneath the speaker plate and within a cavity formed in computer keyboard 16. The diaphragm design and acoustic cavity are further described herein below and illustrated in FIG. 4. There are many types of computer keyboards which can be retrofitted to include a speaker 25. A suitable keyboard can be a 101-type keyboard generally available from Lite-On, Inc., Milpitas, Calif.

Available as part of most computer keyboards and extending from the keyboard is a multi-conductor keyboard cable 26. Cable 26 generally includes six conductors, not all of which are used to drive digital information from keyboard 16 to computer 12. In particular, four conductors are used to provide a clocking signal, a ground signal, a power signal and keystroke data to computer 12. The two spare conductors are generally not used. Of importance to the present design is the use of those two conductors for transmitting analog audio out signal from sound card 22 to speaker 25.

Shown in detail is a mini-din terminal connector 28 arranged at one end of cable 26. Terminal 28 is of common design and is generally provided with cable 26 and keyboard 16 from the manufacturer as an integrated peripheral unit. A preferred terminal 28 available with cable 26 and keyboard 16 is a PS/2, IBM®-compatible connector terminal well known in the art. Terminal 28 includes a circular sleeve 30 which can frictionally engage with a primary electrical coupling 32.

Primary electrical coupling is available as a standard unit at the back surface of computer 12. Primary coupling 32 contains a plurality of female receptacles arranged therein, wherein each receptacle is connected to one end of a wire, oftentimes a printed circuit wire, placed upon card 20. The receptacles frictionally receive male pins 34 (shown in FIG. 2) arranged within terminal 28. Once the receptacles and male pins engage, electrical connection is made between the conductors within cable 26 and wires near or upon card 20. Card 20, and associated circuitry, receives digital data from keyboard 16 and provides clocking signals, ground and power signals to keyboard 16. Furthermore, primary coupling 32 also receives one or two wires routed across card 20. The wires on card 20 can be routed to and electrically connected to the audio output pin 24 of sound card 22. Accordingly, left and right (stereo) audio output can be sent from card 22 through primary coupling 32 to the respective pair of conductors within cable 26, and eventually to a respective pair of speakers 25 arranged upon keyboard 16.

Referring now to FIG. 2, an end view of terminal 28 and sleeve 30 is shown along with male pins 34. Although not shown, each male pin 34 connects to a respective connector within multi-conductor cable 26. The male pins 34 within the mini-din, PS/2 terminal 28 are adapted to electrically engage with the female receptacles upon primary coupling 32.

Referring now to FIG. 3, an alternative embodiment of system 10 is shown. In particular, card 20 need not be retrofitted to include wires or printed wires extending from sound card 22 to primary coupling 32. While it is advantageous to utilize a single primary coupling 32 for accommodating both the audio signals and digital keyboard signals, it is recognized that many existing computers 12 would benefit by not having to be retrofitted. Instead, all that is necessary is that card 22 be placed on card 20 and that the audio output be taken directly from card 22 via a separate terminal (a terminal separate form terminal 28).

The alternative embodiment shown in FIG. 4 utilizes a secondary electrical coupling attached to sound card 22 and electrically coupled to audio output pin 24. Secondary coupling 36 is adapted to receive a conventional audio plug 38. Plug 38 can be either mono or stereo, and is generally available from Shogyo, Inc., of Greatneck, N.Y. 11021, part no. SPY 1000 Series. A suitable secondary electrical coupling 36 is a 3.5 mm audio jack available from RDI Electronics, New Rochelle, N.Y., part no. SJ Series.

Audio plug 38, placable within secondary coupling 36, can communicate via one or a pair of conductors within cable 40 to speaker 25. Thus, two conductors within cable 26 can be branched into cable 40 and connected to sound card 22 by the mating of plug 38 and secondary coupling 36. The remaining four conductors within cable 26 are routed to card 20 by mating terminal 28 to primary coupling 32. Utilizing plug 38 separate from terminal 28 allows direct coupling to all existing computers 12 having a sound card 22. Furthermore, the slight modification at the distal end of cable 26 presents little or no inconvenience to manufacturer of the integrated keyboard 16 and cable 26.

Referring now to FIG. 4, a cross-sectional view of keyboard 16 along plane 4—4 is shown. In particular, a conductor within cable 26 is routed to the voice coil 42 associated with a high quality, inductively driven, diaphragm resonator speaker 25. There are numerous types of speakers available on the market having high quality characteristics (low distortion, high efficiency and high signal-to-noise ratio) with a frequency response range at least 100 Hz to 12 KHz or wider. Any speaker which maintains these characteristics in a relatively small dimension, e.g., less than 12 cm$^2$ is suitable for current application. An exemplary speaker can be obtained from Panasonic Corporation, a division of Matsushita Electric Corporation of America, Secaucus, N.J. 07094, part no. EAS4D01A.

So as to achieve high quality sound output, speaker 25, including diaphragm 44 voice coil 42 and all field-generating hardware are fixed within a cavity 46. Cavity 46 is acoustically designed within keyboard 16 anywhere adjacent speaker 25 within an area sufficient to dissipate energy from the vibrating diaphragm 44 and provide resonance control as well as low frequency base response. Cavity 46 includes an outlet through which vibrating energy or sonic energy (shown by reference numeral 48) can be vented from speaker 25.

It will be appreciated to those skilled in the art having the benefit of this disclosure that this invention is believed to be capable of applications with numerous types of computers 12, any of which embody a sound card 22 with an audio output pin 24 arranged therein. The multimedia keyboard with mounted speaker or speakers can be configured at one end of cable 26 to receive signals from a retrofitted or non-retrofitted computer 12 (i.e., a computer using existing card 20 or a card retrofitted with printed wires therein). Furthermore, it is also to be understood that audio output pin 24 is capable of generating left and right audio output signals necessary for achieving stereophonic sound. The left and right output signals can be transferred to a respective pair of wires placed upon card 22 for output through secondary coupling 36 (as shown in FIG. 3). Alternatively, the left and right audio output signals can be sent from audio output pin 24 through a pair of wires upon card 22 and through another pair of electrically coupled wires upon card 20 to primary electrical coupling 32. In either case, the pair of wires can couple to another pair of wires within cable 26 so as to maintain the stereophonic integrity of the left and right audio output signals sent to a pair of speakers 25 (left and right channel speakers) arranged upon keyboard 16. Thus, the operator can enjoy full stereophonic sound sent from card 24 to keyboard 16 regardless of whether or not the embodiment of FIG. 1 or FIG. 3 is chosen. It is thereby recognized that various modifications and changes may be made without departing from the spirit and scope of the invention as set forth in the claims. An exemplary modification might be one of which uses other forms of terminals or plugs arranged at one end of cable 26 dissimilar from those defined herein. It is intended that the following claims be interpreted to embrace all such modifications and changes.

What is claimed is:

1. An alphanumeric computer keyboard physically separate from and externally coupled to a desktop computer, said desktop computer comprising a main board having at least one input line, a sound card for producing an audio output signal corresponding to a current of varying frequency, said sound card having first and second output lines, and a primary electrical coupling, said primary electrical coupling electrically coupled to said main board by said input line and to said sound board by said first and second output lines, said alphanumeric computer keyboard comprising:

a left channel speaker and a right channel speaker, each said left and right channel speakers being integrated into said keyboard and comprising a diaphragm partially enclosed within said keyboard;

a keyboard cable extending between said keyboard and said computer, said keyboard cable having six conductors, wherein a first one of said six conductors is electrically coupled to said left channel speaker and adapted for coupling to said primary electrical coupling, a second one of said six conductors is electrically coupled to said right channel speaker and adapted for coupling to said primary electrical coupling and a third one of said six conductors is electrically connected to said keyboard and adapted for coupling to said primary electrical coupling;

said first and second conductors capable of transmitting said current of varying frequency from said sound card to said left and right channel speakers via said first and second sound card output lines and said primary electrical coupling when said keyboard is electrically coupled to said computer;

said third conductor capable of transmitting a serialized digital data stream from said keyboard to said main board of said computer via said primary electrical coupling and said input line when said keyboard is electrically coupled to said computer.

2. The computer keyboard as recited in claim, 1, wherein said keyboard cable further comprises a six pin terminal at one end of said cable distal to said computer keyboard, said first, second and third ones of said six conductors terminating in first, second and third ones of said six pin terminal.

3. The computer keyboard as recited in claim 2, wherein said six pin terminal is adapted to electrically couple to said primary electrical coupling, said six pin terminal electrically coupling said first, second and third ones of said six conductors to said first output line, said second output line and said input line, respectively, when said keyboard is electrically coupled to said computer.

4. An alphanumeric computer keyboard physically separate from and externally coupled to a desktop computer, said desktop computer comprising a main board having at least one input line, a sound card for producing an audio output signal corresponding to a current of varying frequency, said sound card having first and second output lines, a primary electrical coupling, and a secondary electrical coupling, said primary electrical coupling electrically coupled to said main board by said input line, said secondary electrical coupling electrically coupled to said sound board by said first and second output lines, said alphanumeric computer keyboard comprising:

a left channel speaker and a right channel speaker, each said left and right channel speakers being integrated into said keyboard and comprising a diaphragm partially enclosed within said keyboard;

a keyboard cable extending between said keyboard and said computer, said keyboard cable having six conductors, wherein a first one of said six conductors is electrically coupled to said left channel speaker and adapted for coupling to said secondary electrical coupling, a second one of said six conductors is electrically coupled to said right channel speaker and adapted for coupling with said secondary electrical coupling and a third one of said six conductors is electrically coupled to said keyboard and adapted for coupling with said primary electrical coupling;

said first and second conductors capable of transmitting said current of varying frequency from said sound card to said left and right channel speakers via said first and second sound card output lines and said secondary electrical coupling when said keyboard is electrically coupled to said computer; and said third conductor capable of transmitting a serialized digital data stream from said keyboard to said main board of said computer via said primary electrical coupling and said input line when said keyboard is electrically coupled to said computer.

5. The computer keyboard as recited in claim 4, wherein said keyboard cable further comprises a six pin terminal and an audio plug at one end of said cable distal to said computer keyboard, said first and second ones of said six conductors terminating in said audio plug and said third one of said six conductors terminating in said six pin terminal.

6. The computer keyboard as recited in claim 5, wherein said six pin terminal is adapted to electrically couple to said primary electrical coupling and said audio plug is adapted to electrically couple to said secondary electrical coupling, said audio plug electrically coupling said first and second conductors with said first and second output lines, respectively, and said six pin terminal electrically coupling said third conductor with said input line when said keyboard is electrically coupled to said computer.

* * * * *